(12) United States Patent
Wangbunyen et al.

(10) Patent No.: US 8,741,412 B2
(45) Date of Patent: Jun. 3, 2014

(54) SEAM AND SEAM TAPE

(75) Inventors: Tanakorn Wangbunyen, Bangkok (TH); Joseph E. Gallagher, Mechanicsville, PA (US)

(73) Assignee: Tanakorn Wangbunyen, Bangkok (TH)

( * ) Notice: Subject to any disclaimer, the term of this patent is extended or adjusted under 35 U.S.C. 154(b) by 229 days.

(21) Appl. No.: 13/247,491

(22) Filed: Sep. 28, 2011

(65) Prior Publication Data

US 2012/0128943 A1    May 24, 2012

(30) Foreign Application Priority Data

Nov. 22, 2010    (EP) .................................... 10450181

(51) Int. Cl.
*B32B 7/12*    (2006.01)

(52) U.S. Cl.
USPC .......................................................... 428/57

(58) Field of Classification Search
USPC .................................................... 428/57, 194
See application file for complete search history.

(56) References Cited

U.S. PATENT DOCUMENTS

| 2003/0138586 A1 | 7/2003 | Fowler |
| 2007/0026186 A1* | 2/2007 | Chapuis .......................... 428/57 |
| 2009/0282602 A1 | 11/2009 | Lepage |

FOREIGN PATENT DOCUMENTS

| FR | 1038106 A | 9/1953 |
| FR | 2889035 A1 | 2/2007 |
| WO | 0181082 A1 | 11/2001 |
| WO | 2006018548 A2 | 2/2006 |

* cited by examiner

*Primary Examiner* — Alexander Thomas
(74) *Attorney, Agent, or Firm* — Steven L. Nichols; Van Cott, Bagley, Cornwall & McCarthy P.C.

(57) ABSTRACT

A seam comprising a first piece of laminated fabric, a second piece of laminated fabric, a layer of adhesive hydrostatic polymer, and a seam tape wherein the first and second pieces of laminated fabrics are coupled together at a common border with the layer of adhesive hydrostatic polymer to form a seam, and wherein the seam tape is at least partially coupled along the seam. A method of forming a seam comprising stacking, in order, a first piece of laminated fabric, at least one strip of adhesive hydrostatic polymer, and a second piece of laminated fabric, ultrasonically coupling the first piece of laminated fabric, strips of adhesive hydrostatic polymer, and second piece of laminated fabric together, wherein at least a portion of adhesive hydrostatic polymer from the strips of adhesive hydrostatic polymer is extruded through the seam, and applying a seam tape along at least a portion of the seam.

15 Claims, 7 Drawing Sheets

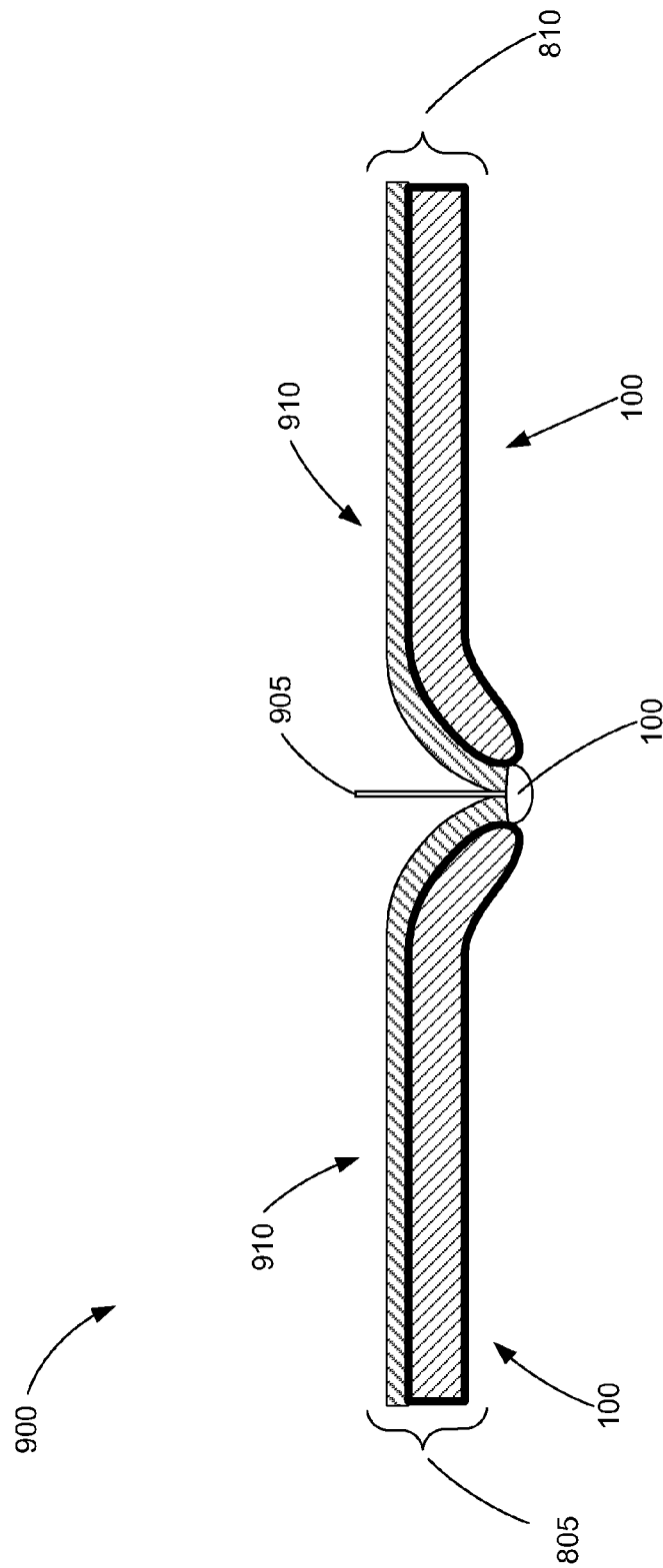

ns and the specification. The illustrated embodiments are merely
SEAM AND SEAM TAPE

RELATED APPLICATION

Pursuant to 35 U.S.C. §119(b) and 37 C.F.R. §1.55(a), the present application corresponds to and claims the priority of European Patent Application No. 10450181.2 filed on Nov. 22, 2010, the disclosure of which is incorporated herein by the reference in its entirety.

BACKGROUND

Waterproof or water resistant clothing has become necessary in locations where the wearer will be subjected to cold and wet conditions. The availability of waterproof or water resistant fabrics for outerwear presents challenges however. Specifically it has proven difficult to create seams in a waterproof or water resistant garment that shares the same or similar water shedding characteristics of the fabrics used in creating the garment. Waterproof fabrics typically contain an outer facing fabric of water repellant material, an inner insulating fabric such as polar fleece, and a hydrostatic barrier material between the inner and outer fabrics. These three layers are typically pressed or laminated together to form a laminated sheet of fabric. The use of laminated fabrics containing a hydrostatic barrier material poses the additional problem of how to join the barrier material across a seam without introducing leak pathways such as those created when the seam is sewn.

A further problem occurs through the use of non-containable fabrics such as fleece or other insulating fabrics, which are difficult to join using an adhesive. Existing methods of joining such fabrics to produce a waterproof seam are unsatisfactory because they result in a bulky, stiff, and unattractive seam. This is because either, during manufacturing of the seam, the hydrostatic barrier is not fully merged across the seam, or because the seams are difficult and time consuming to manufacture. Thus, there remains a need for improved methods and seam designs for creating waterproof seams for outer garments, especially garments made from laminated fabrics containing a hydrostatic membrane and a fleece material.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 9 is a cross-sectional representation of an embodiment of a seam incorporating a single unfolded adhesive strip, according to one embodiment of principles described herein.

Throughout the drawings, identical reference numbers designate similar, but not necessarily identical, elements.

DETAILED DESCRIPTION

Figure 1:
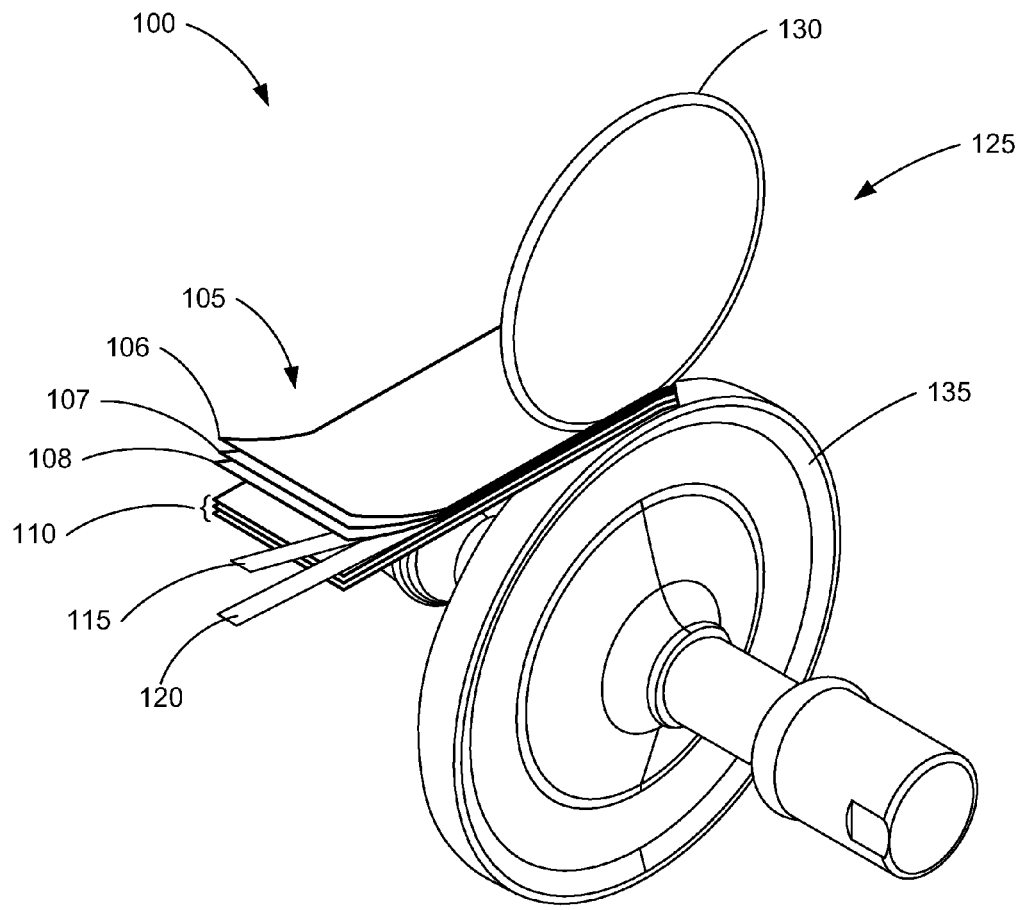
FIG. 1 a schematic representation of a system and process for forming a seam using dual adhesive strips, according to one embodiment of principles described herein.

Seams within a waterproof or water resistant garment have so far demonstrated limited resistance to the elements experienced by the wearer such as water and wind. According to one embodiment of the present application, a waterproof fabric seam contains a first fabric piece, a second fabric piece, and an adhesive hydrostatic polymer. The first fabric piece contains a first waterproof laminated fabric, which includes an inner layer containing a non-containable fabric, an outer layer containing a face fabric, and a middle layer containing a hydrostatic polymer membrane. The second fabric piece contains a second waterproof laminated fabric, which includes an inner layer containing a non-containable fabric, an outer layer containing a face fabric, and a middle layer containing a hydrostatic polymer membrane. The first and second pieces are joined to form a seam along a common border between them. A portion of the adhesive hydrostatic polymer is extruded through the seam and adheres to the face fabrics of the first and second laminated fabrics. The adhesive hydrostatic polymer forms a continuous mass with the hydrostatic polymer membranes of the first and second laminated fabrics along the seam.

Another embodiment of the present application is a method of forming a waterproof fabric seam. The method includes providing a first fabric piece, a second fabric piece, and one or more strips of an adhesive hydrostatic polymer; stacking the pieces along a common border; and cutting and ultrasonically welding along the common border to form a seam. The first fabric piece contains a first waterproof laminated fabric, which includes an inner layer containing a non-containable fabric, an outer layer containing a face fabric, and a middle layer containing a hydrostatic polymer membrane. The second fabric piece contains a second waterproof laminated fabric, which includes an inner layer containing a non-containable fabric, an outer layer containing a face fabric, and a middle layer containing a hydrostatic polymer membrane. The step of stacking the pieces along a common border is accomplished by stacking or layering, in order, the first laminated fabric with its outer layer facing upward, the one or more strips of adhesive hydrostatic polymer, and the second laminated fabric with its outer layer facing downward. The edges of the first laminated fabric, the second laminated fabric, and the one or more strips of adhesive hydrostatic polymer are aligned to form a common border. During the step of cutting and welding to form a seam, a portion of the adhesive hydrostatic polymer is extruded through the seam, and the adhesive hydrostatic polymer fuses with the hydrostatic polymer membranes of the first and second laminated fabrics to form a continuous hydrostatic barrier through the seam.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The present application provides a seam, methods of making the seam, and garments or other products containing the seam. As used in the present specification and the appended claims, the term "seam" is meant to be understood broadly as any seam which creates a hydrostatic barrier between two pieces of waterproof or water resistant fabric. Therefore, a seam in the present application may include a "trough beam seam." A "trough beam seam" according to embodiment of the present application creates a continuous hydrostatic barrier between two pieces of waterproof or water resistant fabric through the use of a continuous mass of adhesive hydrostatic polymer formed within the seam. This can be accomplished by using an ultrasound sonotrode together with a seam design containing matched surface areas that allows the adhesive to be thermally applied to a non-containable laminated fabric to create a hydrostatically sealed seam structure. The trough beam seam is especially suited for joining laminated fabrics containing an inner layer that is impervious to water, and a layer containing a non-containable fabric.

Additionally, as used in the present specification and the appended claims, the term "non-containable fabric" is meant to be understood broadly as any fabric that does not allow saturation of the spaces between fibers of the fabric by an adhesive so as to create a hydrostatic seal. A non-containable fabric generally has a large volume of open space between microfibers of the fabric. Examples of a non-containable fabric include fleece and other insulating materials.

Still further, as used in the present specification and the appended claims, the term "fleece" or "fleece fabric" is meant to be understood broadly as any pile fabric, including woolen fabrics as well as synthetic fabrics. Fleece for use in the present application can be made of or derived from either a natural fiber such as wool or a synthetic polymer such as polyethylene terephthalate (PET) (e.g., Polarfleece® by Polartec, LLC). Fleece is typically lightweight, insulating, hydrophobic, and breathable or that is to say it allows water vapor to pass through. Pile fabrics are made by dying loose fibers, which are then mixed and combed into a long rope that is guided into a knitting machine, which permanently locks the fibers into a backing. The fabric is then sheared and finished. A pile results from the individual fibers standing on end. Fleece, being a pile fabric, is also made the same way by first twisting fibers into a yarn, which is then knitted into a fabric. The fabric is then brushed, sheared, and finished.

Even further, as used in the present specification and the appended claims, the term "insulating material" is meant to be understood broadly as any natural or synthetic material that provides thermal insulation. Insulation for use in the present application can be made of a synthetic polymer, such as Thinsulate™ microfibers by Minnesota Mining and Manufacturing Company (3M). Insulating material is typically lightweight and breathable, and made from fibers that can be hydrophobic or hydrophilic, fire retardant, and flexible. Insulating material may even be obtained from recycled materials or from renewable fibers.

Fabrics joined by a seam such as a trough beam seam according to the present application are laminated fabrics or coated fabrics, and may further have waterproof or water resistant characteristics. As used in the present specification and the appended claims, the term "laminated fabric" is meant to be understood broadly as any fabric that includes at least two layers. According to one embodiment of the present application, the laminated fabric may contain three layers: an outer layer containing a face fabric, an inner layer containing a non-containable fabric such as fleece or another insulating material, and a middle layer disposed between the outer and inner layers and containing a hydrostatic polymer membrane. Additional layers may also be present such as one or more support layers for the hydrostatic barrier membrane, mechanically reinforcing layers, and layers of adhesive between structural layers.

Additionally, as used in the present specification and the appended claims, the term "coated fabric" is meant to be understood broadly as any fabric that has been coated with a chemical agent such as polyurethane, polyester, or polypropylene that coats the fabric and forms a liquid layer or a membrane within the fabric that serves a similar function as a hydrostatic polymer membrane in a laminated fabric. The fabric pieces joined by the seam of the present application can be comprised of identical or different materials incorporating various coating as well as various colors or textures and may be selected according to design preferences or other requirements of the garment or product in which the seam is located.

Furthermore, as used in the present specification and the appended claims, the term "hydrostatic polymer membrane" or "hydrostatic barrier membrane" is meant to be understood broadly as any layer of synthetic or natural polymers that resist the passage of liquid water, whether in the form of droplets or microdroplets, across the membrane. The hydrostatic polymer membrane may, however, allow the passage of water vapor, in the form of individual water molecules, so as to promote breathability of the laminated fabric. A hydrostatic polymer membrane can be prepared from a material such as microporous or nanoporous polytetrafluoroethylene (PTFE), expanded PTFE (ePTFE), polyurethane, polypropylene, or polyester.

Even further, as used in the present specification and the appended claims, the term "face fabric" is meant to be understood broadly as the fabric on the outside of the garment. The face fabric can be any type of fabric, but preferably is mechanically strong and abrasion resistant enough to resist at least regular wear and tear which the garment may be subjected to. In one exemplary embodiment, the face fabric may also be water repellent or water resistant. The face fabric can be, for example, a soft woven fabric, or any fabric woven or knit from one or more yarns of synthetic or natural material. Materials for the face fabric can include, for example, polyesters, polyamides, polyvinylchlorides, polyketones, polysulfones, polycarbonates, fluoropolymers, polyacrylates, polyurethanes, co-polyetheresters, polypropylenes, and co-polyetheramides. The face fabric can have any desired color and texture, and can be dyed or needed to achieve a desired appearance. Additionally, the face fabric may be impregnated with various chemicals so as to achieve certain functionality, such as water repellency. For example, the face fabric may be impregnated with a fluoropolymer durable water repellant (DWR).

An example of a waterproof laminated fabric is Gore-Tex® (a registered trademark of W. L. Gore and Associates), which utilizes a porous PTFE membrane as the hydrostatic polymer membrane. The PTFE membrane of a Gore-Tex® fabric has a microstructure characterized by nodes interconnected by fibrils. The microporous or nanoporous nature of the PTFE membrane is such that water droplets are excluded from the pores, whereas water molecules can pass through the pores.

A seam according to the present application is assembled using an adhesive hydrostatic polymer. As used in the present specification and the appended claims, the term "adhesive hydrostatic polymer" is meant to be understood broadly as any polymeric adhesive material or resin that forms a hydrostatic barrier within the seam. Adhesive polymer resins can be selected for their adhesion properties, hydrophobicity or hydrophilicity, melting point, shear resistance, bonding and/or coating properties, washing and dry cleaning temperature resistance, cleaning solvent resistance, high temperature resistance or in other words the ability to withstand autoclaving, chemical resistance, gas resistance, resistance to pathogens such as viruses and bacterial, as well as ability to commingle with the laminated fabrics or their components so as to create a hydrostatically sealed seam. Suitable adhesive polymer resins include polyurethanes, polypropylenes, polyamides, polyesters, and polyolefins. The adhesive hydrostatic polymer can be cross-linked or non-cross-linked. The adhesive property of the adhesive hydrostatic polymer can be activated by, for example, heat, light, pressure, or chemical reaction. In one exemplary embodiment of the present application, the adhesive hydrostatic polymer has a melting temperature that allows it to melt during ultrasonic welding, and a viscosity in the melted state that allows it to flow through the seam structure and be extruded out of a cut end of the seam during a cutting and welding operation carried out by an ultrasonic welding machine during the formation of the seam. In another exemplary embodiment, the adhesive hydrostatic polymer is also hydrophobic. In certain embodiments, the adhesive hydrostatic polymer is flexible and elastic enough to withstand active use of a garment containing the seam without breaking or forming leaks in the seam. In certain embodiments, the adhesive hydrostatic polymer can be solvent resistant, shear resistant, heat resistant, or resistant to microbial attack.

An adhesive hydrostatic polymer can be supplied to construct a seam in a variety of different forms. In one exemplary embodiment the adhesive hydrostatic polymer is supplied in the form of a strip or tape that allows it to be conveniently applied along the length of the seam. Therefore, an automated adhesive tape feeding device may be used for this purpose. Specifically, the automated adhesive tape feeding device may be configured to feed any number of adhesive tape segments or lengths or even a single piece of folded adhesive tape along the length of the seam before seam fabrication. The shape and dimensions of an adhesive polymer strip can vary, but should be consistent with applying the adhesive polymer resin to the seam such that the resin becomes distributed within the seam and fuses with the hydrostatic membrane material of both fabric pieces along the length of the seam.

In one exemplary embodiment, one or more adhesive strips can be used to make the seam. In another exemplary embodiment the adhesive strips can be folded and oriented in different ways so that the adhesive resin flows into the seam structure and contacts the hydrostatic membranes of the fabric pieces.

In another exemplary embodiment, a single strip of adhesive can be used, and in that case the width of the strip is limited so that the finished seam can be opened (i.e., the fabric pieces laid flat) while at least the bulk of the adhesive material remains within the seam structure.

In yet another exemplary embodiment, two strips of adhesive can be used, wherein they are fused together within the seam, and optionally a portion of each strip remains attached to a fabric surface adjacent to the seam. In some embodiments, a strip of adhesive hydrostatic polymer is folded into a U-shaped or Y-shaped strip for incorporation into the seam; either the open or closed portion of the folded strip being aligned with the common fabric border that forms the seam. In this case, the strip of adhesive hydrostatic polymer is capable of being folded into a stable conformation.

Referring now to FIG. 1, a schematic representation of a system (100) and process for forming a seam using dual adhesive strips (115, 120) is shown. As can be seen, a stack of fabrics (105, 110) and adhesive strips (115, 120) are subjected to a cutting and welding operation in an ultrasonic welding machine (125). The fabric stacks (105, 110) are passed between cutting anvil (130) and rotary sonotrode (135) wherein the rotary sonotrode (135) rotates and applies ultrasonic energy at an area along the fabrics (105, 110) and adhesive strips (115, 120) sufficient to melt the adhesive strips (115, 120). The cutting anvil (130) simultaneously cuts the aligned edge of the stack of fabrics (105, 110) to form the seam.

The stack of fabrics (105, 110) is formed by placing first piece of laminated fabric (105) opposite second piece of laminated fabric (110). The first piece of laminated fabric (105) contains three layers: an inner fleece layer (106), a hydrostatic polymer membrane (107), and an outer shell layer (108). The second piece of laminated fabric (110) has corresponding layers, which are not depicted separately in FIG. 1. The first (105) and second (110) fabric pieces are stacked in opposite orientation with respect to each other, having their outer layers (108) facing toward each other while their inner layers (106) are facing away from each other. Two strips of adhesive hydrostatic polymer (115, 120) are placed, one over the other, between the two laminated fabric pieces (105, 110) and aligned with the common border between the fabric pieces (105, 110). Adhesive strips (115, 120) can be composed of or contain either identical or different types of adhesives. In one embodiment, both adhesive strips (115, 120) utilize the same adhesive polymer resin material. The adhesive strips (115, 120) are wide enough to cover the cutting line defined by the cutting anvil (130) while leaving additional adhesive to cover a portion of the outer shell fabrics (108) of both the first (105) and second (110) fabric pieces once the seam has been opened and flattened. In one embodiment, the adhesive strips (115, 120) may be used with a carrier paper such to allow the adhesive resin to liquefy without contaminating the thermal devices required for seaming. Alternatively or additionally, the adhesive strips (115, 120) may be used with a release paper to allow the removal of the release paper after the seam has been formed so that the adhesive resin may liquefy without contaminating the thermal devices required for seaming.

The ultrasonic energy applied by the rotary sonotrode (135) during seaming can be adjusted accordingly in order to create a seam along first (105) and second (110) fabric pieces. Therefore the characteristics of the fabrics and the adhesives used to create the seam may dictate the magnitude and frequency (typically from 10 Hz-80 Hz) of the ultrasonic energy used. Specifically, welding conditions depend on temperature and humidity during the welding process as well as the type of fabric used for the outer shell layer (108) hydrostatic polymer membrane (107) layer, and fleece (106) layer. Adjusting an ultrasonic fabric welding machine (125) so as to adapt to these various circumstances is well within the capabilities of an operator of the machine (125). It is understood that an ultrasonic cutting and welding machine (125) can be used to carry out the methods of the present application in different modes. For example, an open area weld mode provides a thermal reaction between an ultrasound tool and an ultrasound sonotrode (135) across the fleece (106). This creates a melted surface area in a "U" cup pattern, which allows the adhesive from the adhesive strips (115, 120) to flow and attach the laminate membranes thereby creating a hydrostatic seal.

A flat compression weld mode provides a thermal reaction between an ultrasound tool, an ultrasound cutting and welding tool across the fleece (106). This creates a flat fiber surface area, which allows a seam tape to adhere to the edges left behind by an open area weld operation.

While the seam depicted in FIG. 1 forms a straight line, it can be appreciated that according to the principles of the present application a seam such as a through beam seam can be either straight or curved, and the fabric pieces (105, 110) joined by the seam can have any shape or form as required for a particular garment piece. In addition, while the embodiment depicted in FIG. 1 joins two pieces of fabric (105, 110), it can further be appreciated that three or more pieces of fabric (105, 110) can also be joined into a compound seam by adding one or more additional fabric pieces (105, 110) and additional adhesive strips (115, 120) between the fabric pieces (105, 110), as required. For example, multiple pieces of fabric (105, 110) may be used to construct a crossover seam, a superimposed seam, or a lapped seam. It can further be appreciated that other sources of energy can be used to perform a seam welding operation for use in the present application examples of which may include heat energy, laser energy, as well as various forms of electromagnetic radiation such as microwave or radio frequency (RF) radiation.

After the cutting and welding operation, the seam formed as shown in FIG. 1 can be opened and flattened. The flattened seam (200) is shown in cross-sectional representation in FIG. 2. The outer face (205) of the seam (200) contains an adhesive weld layer (210) that has a Y-shaped cross section and is formed from adhesive strips (FIGS. 1, 115 and 120) which have been welded together at the joint between the first (FIG. 1, 105) and second (FIG. 1, 110) fabric pieces. The inner face of the seam (210) contains a continuous small bead of extruded adhesive hydrostatic polymer (215), which runs the length of the seam (210). Thus, after seam formation, the adhesive hydrostatic polymer has fused with the hydrostatic polymer membranes (FIG. 1, 107) of both the first (FIG. 1, 105) and second (FIG. 1, 110) fabric pieces and forms a continuous hydrostatic barrier mass that joins the membranes (FIG. 1, 107) and extends through the seam (200) into the extruded portion of adhesive (215), thereby forming an effective water barrier along the length of the seam (200).

Figure 2:
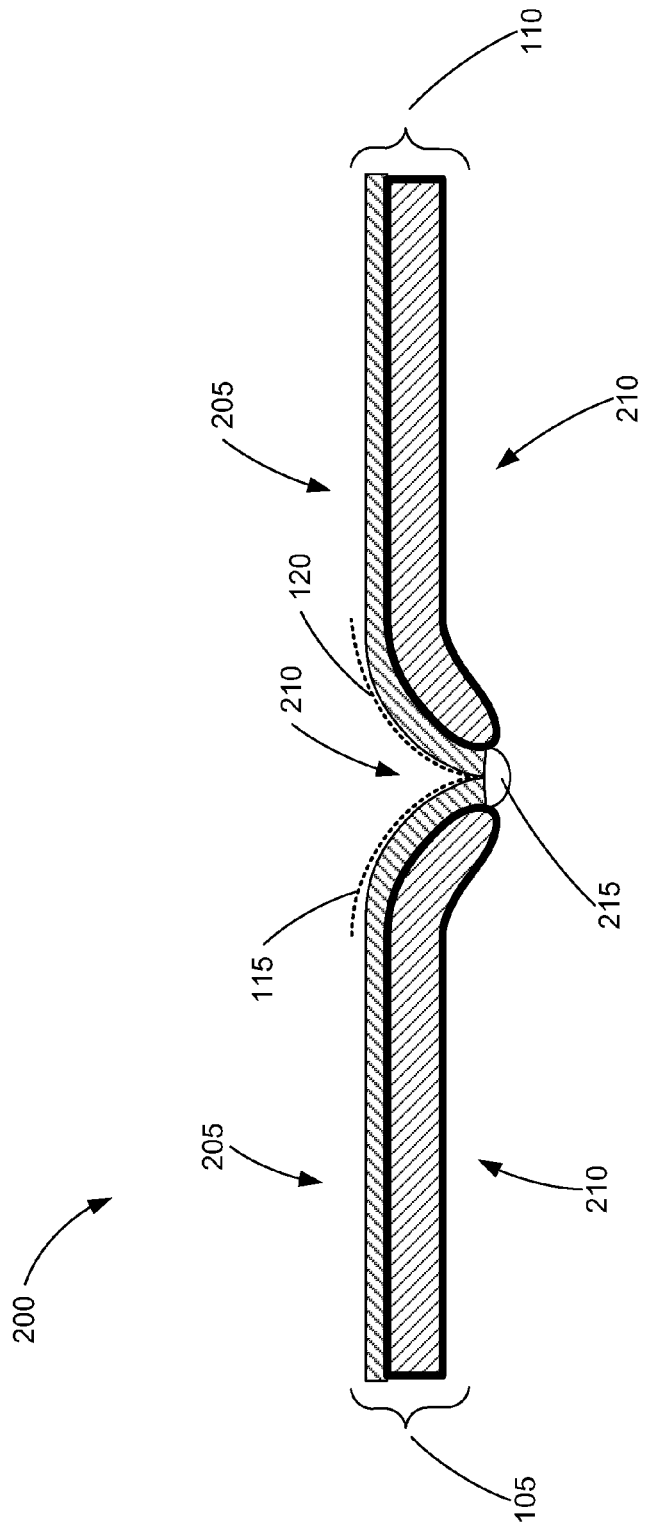
FIG. 2 is a cross-sectional representation of an embodiment of a seam made from dual adhesive strips, according to one embodiment of principles described herein.
Figure 3:
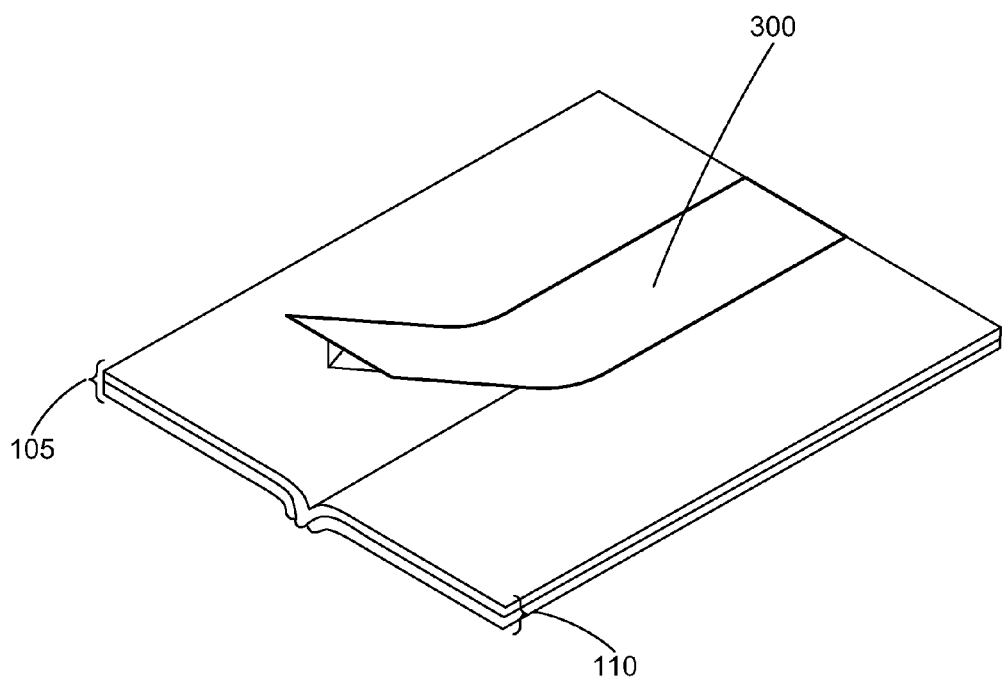
FIG. 3 is a representation of a process of applying a seam tape to a seam, according to one embodiment of principles described herein.

The seam (200) shown in FIGS. 1 and 2 forms an effective, thin, and flexible waterproof seam and can be utilized as is. However, if greater mechanical stability or an even more effective hydrostatic barrier is desired, or even if a desired appearance is to be provided, seam tape (FIG. 3, 300) can be added to the seam as depicted in FIG. 3. FIG. 3 is a representation of a process of applying a seam tape (300) to a seam (FIG. 2, 200). The seam tape (300) has at least two layers: an outer fabric layer (FIG. 4, 400) and an inner adhesive layer (FIG. 4, 410).

Figure 4:
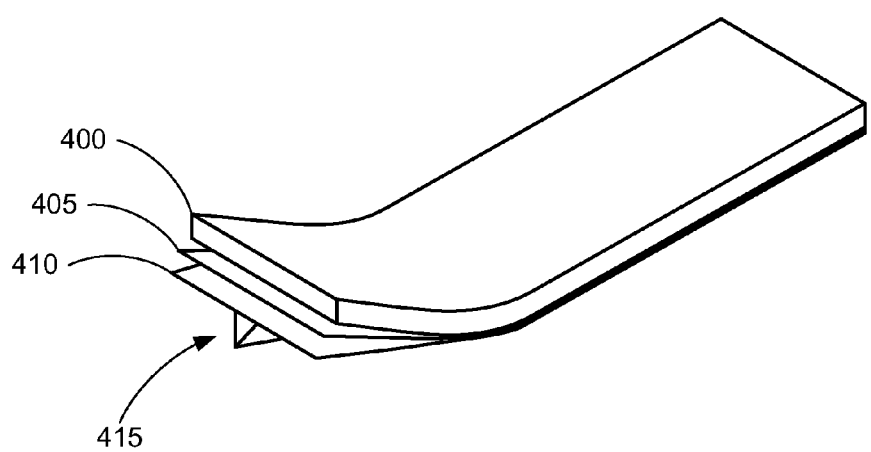
FIG. 4 is a detailed view of an embodiment of a seam tape, according to one embodiment of principles described herein.

Turning now to FIG. 4 a detailed view of an embodiment of a seam tape, according to one embodiment of principles described herein is shown. In this embodiment, outer shell fabric (400) is selected to match or coordinate with the outer shell fabric (FIG. 1, 108) of the first (FIG. 1, 105) and second (FIG. 1, 110) fabric pieces that are joined at the seam (FIG. 2, 200). Specifically, the outer shell fabric (400) of the seam tape (FIG. 3, 300) may be selected based on the color, pattern, bias or cross grain, texture and type of material used.

A hydrostatic barrier membrane (405) may also be included below the outer shell fabric (400), and according to one embodiment the membrane (405) may be constructed of the same material as the hydrostatic polymer membrane (FIG. 1, 107) in the laminated fabric pieces (FIG. 1, 105, 110). The adhesive layer (410) is also selected to match the adhesive material present in the adhesive strips (FIG. 1, 115, 120).

Finally, extruded adhesive plug (415) is added to the seam tape (FIG. 3, 300). The adhesive plug (415) may correspond to the shape of the seam (FIG. 2, 200), with which it conforms and in one exemplary embodiment serves to fill the seam (FIG. 2, 200) with additional adhesive thereby providing further seam (FIG. 2, 200) stability. Specifically, the adhesive plug (415) may be comprised of a "v-shaped" or "wedged-shaped" adhesive line which runs along the longitudinal axis of the seam tape (FIG. 3, 300). The adhesive plug (410) may be made of an adhesive hydrostatic polymer much like the adhesive strips (FIG. 1, 115, 120) or may be made of another type of material having similar hydrostatic properties.

A seam tape (FIG. 3, 300) can be applied to either the outer shell layer (FIG. 1, 108) side of the seam (FIG. 2, 200) or to the inner fleece layer (FIG. 1, 106) side of the seam (FIG. 2, 200), or both. While a seam tape (FIG. 3, 300) on the inner fleece layer (FIG. 1, 106) side of the seam (FIG. 2, 200) would not add significantly to the hydrostatic resistance of the seam (FIG. 2, 200), it can add mechanical stability and improve the integrity of the seam (FIG. 2, 200). The seam tape ((FIG. 3, 300) can be applied using any known method, such as by using a heat-sensitive adhesive with application of heat. The heat for seam tape (FIG. 3, 300) application can be provided by any suitable source, such as hot air, a hot press, or an ultrasonic source such as the ultrasonic welding machine of FIG. 1 (125).

Figure 6:
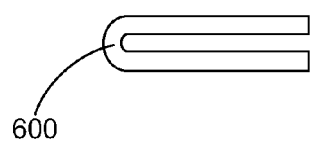
FIG. 6 is a detailed view of a U-shaped adhesive polymer strip, according to one embodiment of principles described herein.

The hydrostatic resistance of a seam (FIG. 2, 200) is not dependent upon driving the adhesive plug (415) of a seam tape (FIG. 3, 300) through the surfaces of the first (FIG. 1, 105) and second (FIG. 1, 110) piece of laminated fabric to re-connect the hydrostatic polymer membrane (FIG. 1, 107) surfaces, as is required with prior art methods. Instead, the hydrostatic resistance of the seam (FIG. 2, 200) is accomplished by ultrasonically cutting and welding two pieces of laminated fabric (FIG. 1, 105, 110) in a manner that allows the hydrostatic barrier membranes (FIG. 1, 107) in each fabric piece (FIG. 1, 105, 110) to be joined by two pieces of a single-ply adhesive film (115, 120), or by a single folded piece of adhesive (FIG. 6, 600). The seam (FIG. 2, 200) may be further enhanced by sealing the seam (FIG. 2, 200) with the seam tape (FIG. 3, 300).

Therefore, in one exemplary embodiment, a hydrostatic seam (FIG. 2, 200) may be formed by applying at least one strip of adhesive hydrostatic polymer strip (FIG. 1, 115, 120) to a seam (FIG. 2, 200), cutting and welding the seam together using a ultrasonic welding machine (FIG. 1, 125), applying seam tape (FIG. 3, 300) to the outside of the seam (FIG. 2, 200) using an adhesive hydrostatic polymer plug (410) to fill in the v-shaped seam (FIG. 2, 200), and applying a second seam tape (FIG. 3, 300) to the inside of the seam (FIG. 2, 200).

Several known methods are available for testing the hydrostatic resistance properties of the seam (FIG. 2, 200) of the present exemplary embodiments. These include ASTM D 5385 Standard Test Method for Hydrostatic Pressure Resistance of Waterproofing Membranes. In one exemplary embodiment, the seam (FIG. 2, 200) has a hydrostatic resistance of at least 3 psi for 3 minutes using the ASTM D 5385 Standard Test Method for Hydrostatic Pressure Resistance of Waterproofing Membranes.

Figure 5:
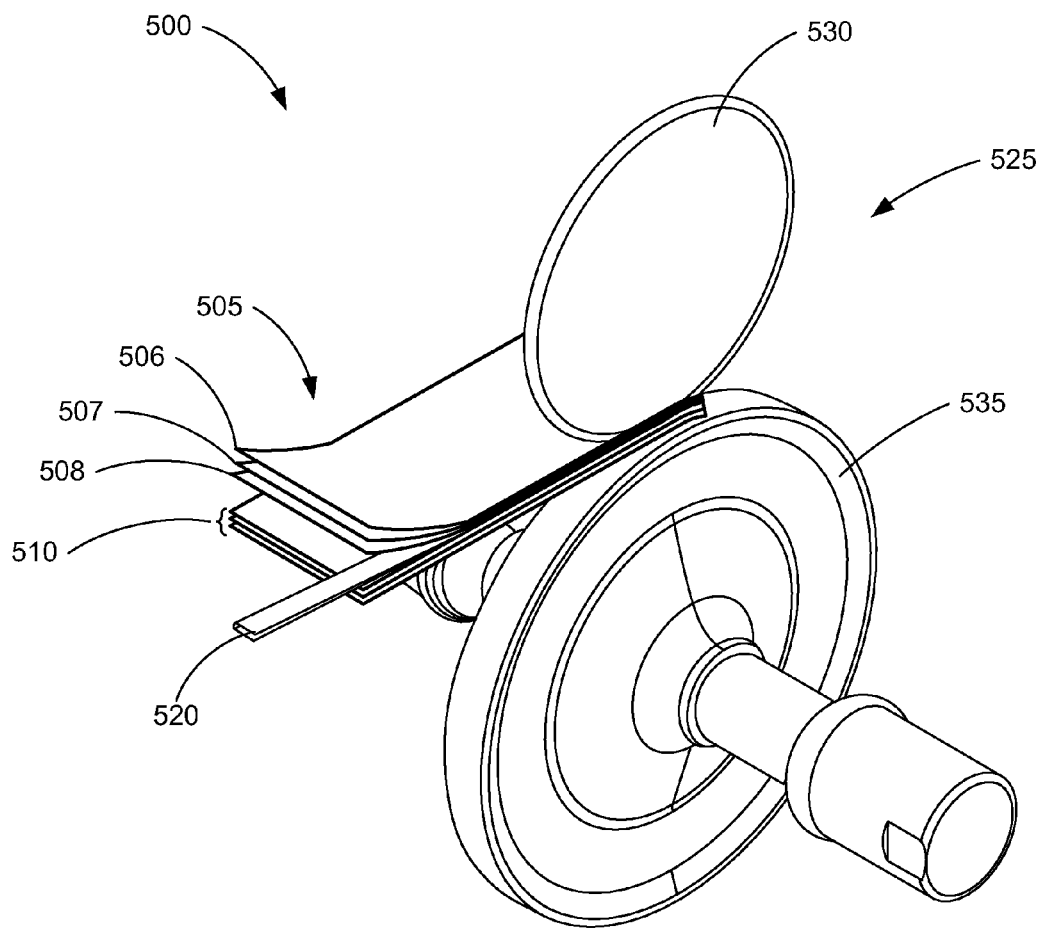
FIG. 5 is a schematic representation of a process for forming a seam using a U-shaped adhesive polymer strip, according to one embodiment of principles described herein.

According to another embodiment, a schematic representation of a process for forming a seam using a U-shaped adhesive polymer strip is shown in FIG. 5. Much like the embodiment of FIG. 1, forming the seam may first comprise of providing a stack of fabrics (505, 510). Unlike FIG. 1, however, instead of two adhesive strips (FIG. 1. 115, 120), one single adhesive strip (520) is subjected to a cutting and welding operation in an ultrasonic welding machine (525). Again, the fabric stacks (505, 510) are passed between cutting anvil (530) and rotary sonotrode (535) wherein the rotary sonotrode (535) rotates and applies ultrasonic energy at an area along the fabrics pieces (505, 510) and adhesive strip (520) sufficient to melt the adhesive strip (520). The cutting anvil (530) simultaneously cuts the aligned edge of the stack of fabrics (505, 510) to form the seam. The stack of fabrics (505, 510) is formed by placing a first piece of laminated fabric (505) opposite a second piece of laminated fabric (510). The first piece of laminated fabric (505) contains three layers: an inner fleece layer (506), a hydrostatic polymer membrane (507), and an outer shell layer (508). The second piece of laminated fabric (510) has corresponding layers, which are not depicted separately in FIG. 5. The first (505) and second (510) fabric pieces are stacked in opposite orientation with respect to each other, having their outer layers (508) facing toward each other and their inner layers (506) facing away from each other. The strip of adhesive hydrostatic polymer (520) is placed between the two laminated fabric pieces (505, 510) and aligned with the common border between the fabric pieces (510). The adhesive strip (520) is wide enough to cover the cutting line defined by the cutting anvil (530) while leaving additional adhesive to cover a portion of the outer shell fabrics (508) of both the first (505) and second (510) fabric pieces once the seam has been opened and flattened. The adhesive strip (520) may be used with a carrier paper and/or a release paper to allow the adhesive resin in the adhesive strip (520) to liquefy without contaminating the thermal devices required for seaming.

The ultrasonic energy applied by the rotary sonotrode (535) during seaming can be adjusted accordingly in order to create a seam along first (505) and second (510) fabric pieces. Therefore the characteristics of the fabrics and the adhesives used to create the seam may dictate the magnitude and frequency (typically from 10 Hz-80 Hz) of the ultrasonic energy used. Specifically, welding conditions depend on temperature and humidity during the welding process as well as the type of fabric used for the outer shell layer (508) hydrostatic polymer membrane (507) layer, and fleece (506) layer. Adjusting an ultrasonic fabric welding machine (525) so as to anticipate these various conditions is well within the capabilities of an operator of the machine (525). It is understood that an ultrasonic cutting and welding machine (525) can be used to carry out the methods of the present application in different modes. For example, an open area weld mode provides a thermal reaction between an ultrasound tool and an ultrasound sonotrode (535) across the fleece (506). This creates a melted surface area in a "U" cup pattern, which allows the adhesive from the adhesive strip (520) to flow and attach the laminate membranes thereby creating a hydrostatic seal.

A flat compression weld mode provides a thermal reaction between an ultrasound tool, an ultrasound cutting and welding tool across the fleece (506). This creates a flat fiber surface area, which allows a seam tape (FIG. 3, 300) to adhere to the edges left behind by an open area weld operation.

While the seam depicted in FIG. 5 forms a straight line, it can be appreciated that according to the principles of the present application a seam such as a through beam seam can be either straight or curved, and the fabric pieces (505, 510) joined by the seam can have any shape or form as required for a particular garment piece. In addition, while the embodiment depicted in FIG. 5 joins two pieces of fabric (505, 510), it can further be appreciated that three or more pieces of fabric (505, 510) can also be joined into a compound seam by adding one or more additional fabric pieces (505, 510) as required. For example, multiple pieces of fabric (505, 510) may be used to construct a crossover seam, a superimposed seam, or a lapped seam.

It can further be appreciated that other sources of energy can be used to perform a seam welding operation for use in the present embodiment and may include heat energy, laser energy, as well as various forms of electromagnetic radiation such as microwave or radio frequency (RF) radiation.

In the method depicted in FIG. 5, a single folded strip of hydrostatic polymer adhesive (FIG. 6, 600) is substituted for the two adhesive strips (FIG. 1, 115, 120) shown in FIG. 1. A detailed view of the folded adhesive strip in cross-section is shown in FIG. 6. As can be seen in FIG. 6, the adhesive strip has been folded into a "U-shape" prior to assembling the first (505) and second (510) pieces of laminated fabric. In another embodiment, the adhesive strip (600) could be folded another way, such as into a "V-shape", a "Y-shape", or another shape. In a one-piece adhesive strip (600) embodiment, the original edges of the adhesive strip (600) are placed at the outside edge of the first (505) and second (510) pieces of laminated fabric and the adhesive strip (600) while the edge created by folding the adhesive strip (600) is placed away from the exposed edge of the first (505) and second (510) pieces of laminated fabric. The use of a folded adhesive strip (600) can provide easier handling while forming the seam as well as providing greater stability of the stack during the seaming operation. When the seam (FIG. 7, 700) is opened after using a one-piece adhesive strip, a structure is formed such as that shown in FIG. 7. The folded adhesive film (FIG. 6, 600) forms an exposed loop (705) of adhesive at the outer side (710) of the seam (700). The cut portion of the folded adhesive strip (FIG. 6, 600) gives rise to extruded bead of adhesive (715), which runs along the length of the seam (700) on the inside (720) of the seam (700).

The exposed loop of adhesive (705) can be hidden and the seam (700) reinforced by applying a seam tape (FIG. 3, 300) to cover the loop of adhesive (705). Similar to the previous embodiment, the seam tape (FIG. 3, 300) can optionally include a hydrostatic barrier membrane (FIG. 4, 405) that fuses with the hydrostatic polymer adhesive in the seam structure, thereby forming a continuous hydrostatic barrier connecting the hydrostatic barrier membranes (FIG. 5, 507) of the fabric pieces across the seam (700). The seam tape (FIG. 3, 300) is used to join the adhesives of the seam strip (FIG. 6, 600) thereby connecting the hydrostatic barrier membranes (FIG. 5, 507) to the membrane (FIG. 4, 405) of the seam tape (FIG. 3, 300). The fabric surface chemistry and the spaces between its microfibers are thus bypassed, because the combined adhesive structures eliminate the hydrostatic edge of the seam tape (FIG. 3, 300).

Figure 8:
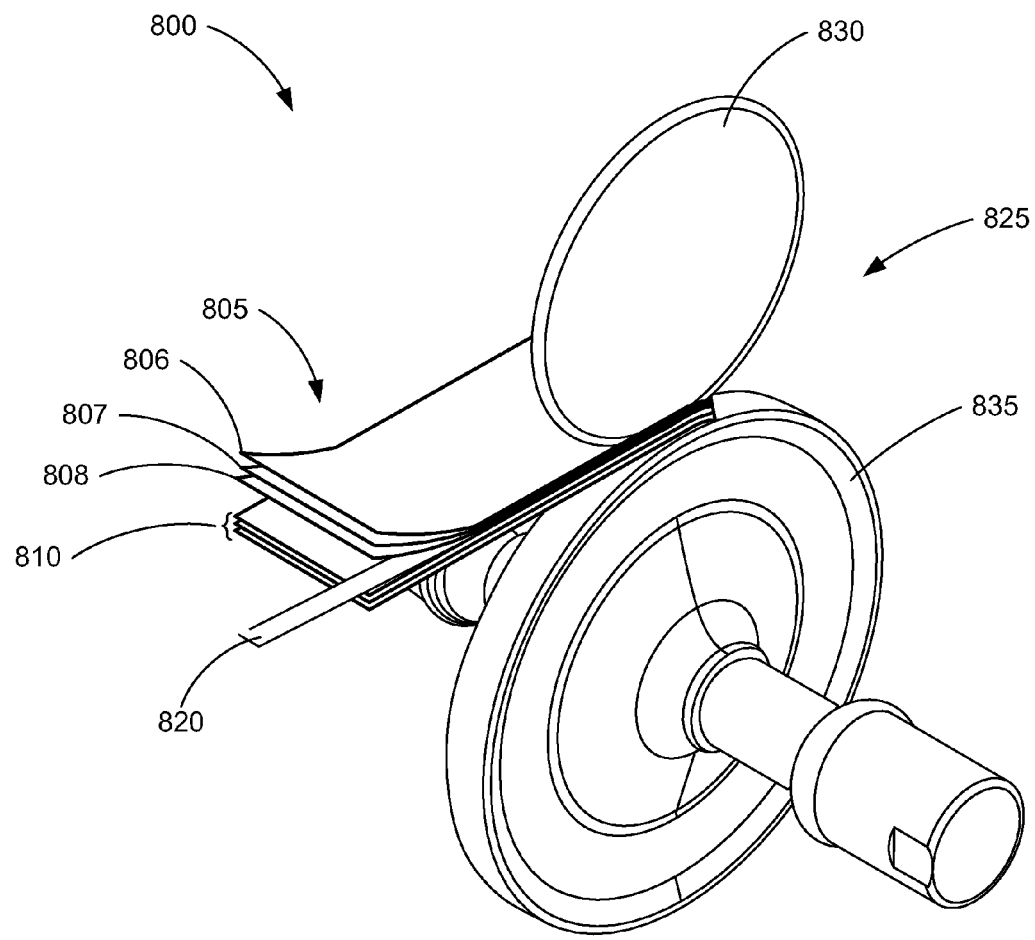
FIG. 8 is a schematic representation of a process for forming a seam using a single adhesive strip, according to one embodiment of principles described herein.

In another alternative embodiment, a trough beam seam is formed using a one-piece adhesive strip that is flat and unfolded. This process is represented in FIG. 8, and a cross-section of the formed seam is shown in FIG. 9. Again, much like FIGS. 1 and 5, forming the seam (FIG. 9, 900) may first comprise providing a stack of fabrics (805, 810). Unlike FIGS. 1 and 5, however, instead of being limited to one or two adhesive strips (FIG. 1, 115, 120; FIG. 5, 520), any number of adhesive strips (820) may be used. Again, the fabric stacks (805, 810) are passed between cutting anvil (830) and rotary sonotrode (835) wherein the rotary sonotrode (835) rotates and applies ultrasonic energy at an area along the fabrics pieces (805, 810) and adhesive strip (820) sufficient to melt the adhesive strip (820). The cutting anvil (830) simultaneously cuts the aligned edge of the stack of fabrics (805, 810)

to form the seam (FIG. 9, 900). The stacks of fabrics (805, 810) are formed by placing a first piece of laminated fabric (805) opposite a second piece of laminated fabric (810). The first piece of laminated fabric (805) contains three layers: an inner fleece layer (806), a hydrostatic polymer membrane (807), and an outer shell layer (808). The second piece of laminated fabric (810) has corresponding layers, which are not depicted separately in FIG. 8. The first (805) and second (810) fabric pieces are stacked in opposite orientation with respect to each other, having their outer layers (808) facing toward each other and their inner layers (806) facing away from each other. The strip of adhesive hydrostatic polymer (820) is placed between the two laminated fabric pieces (805, 810) and aligned with the common border between the fabric pieces (810). The adhesive strip (820) is wide enough to cover the cutting line defined by the cutting anvil (830) while leaving additional adhesive to cover a portion of the outer shell fabrics (808) of both the first (805) and second (810) fabric pieces once the seam (FIG. 9, 900) has been opened and flattened. The adhesive strip (820) may be used with a carrier paper and/or a release paper to allow the adhesive resin in the adhesive strip (820) to liquefy without contaminating the thermal devices required for seaming.

In the embodiment shown in FIGS. 8 and 9, a residual portion (905) of an adhesive strip (820) remains exposed on the outer face (910) of the seam (900). The amount of the residual portion (905) can be varied by selecting an appropriate width of adhesive strip (820). If desired, the residual portion (905) can be very small, so as to remain practically unseen from the outside of the garment. Alternatively, the residual portion (905) of adhesive strip (820) can be larger, and can be covered with seam tape (FIG. 3, 300). If desired, the residual portion (905) can bind to or combine with the adhesive on a seam tape (FIG. 3, 300) as the seam tape (FIG. 3, 300) is applied to the outside of the seam (900).

Figure 7:
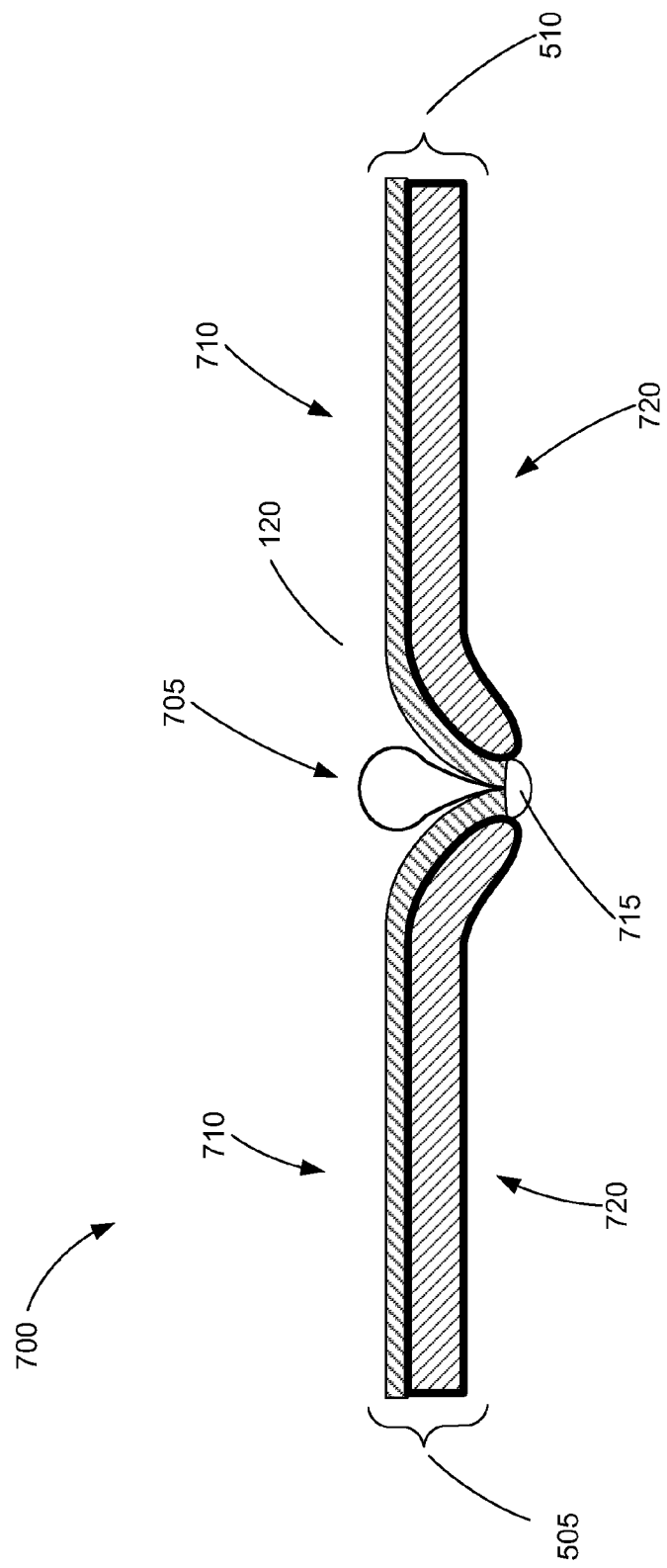
FIG. 7 is a cross-sectional representation of an embodiment of a seam incorporating a U-shaped adhesive strip, according to one embodiment of principles described herein.

The methods of forming a seam, the seams (FIG. 2, 200; FIG. 7, 700; FIG. 9, 900), and the seam tape (FIG. 3, 300) described herein can be utilized in the production of any type of garment such as outerwear garment which may include waterproof jackets and coats of any design. A garment product produced using any of the methods of forming a seam, the seams (FIG. 2, 200; FIG. 7, 700; FIG. 9, 900), and the seam tape (FIG. 3, 300) according to the present specification can be used, for example, either as a liner for an outer shell assembly or as a stand-alone product. Other garments that can be produced using the methods and seams of the present application include pants, gloves, hats, and socks. The methods of forming a the and the seams (FIG. 2, 200; FIG. 7, 700; FIG. 9, 900) of the present specification can also be used in any textile product or any product containing a seam between two fabric pieces, including footwear, tents, and other products. Seam tapes (FIG. 3, 300) can be designed to include a face fabric (FIG. 4, 400) that is identical to the face fabric of the laminated fabric pieces (FIG. 1, 105, 110; FIG. 5, 505, 510; FIG. 8, 805, 810) joined by a seam or, as described above, may have contrasting color or texture. The face fabric (FIG. 4, 400) of a seam tape (FIG. 3, 300) used to cover a seam may be cut on the same bias as the face fabric of the pieces to be joined to ensure optimum stretch characteristics. Seam structure and seam tape (FIG. 3, 300) can be provided in different widths, such as in widths of 6 mm, 8 mm, or 10 mm or wider. The methods described herein can be carried out manually, via an automatic system, or any combination thereof.

The present exemplary methods and embodiments make possible a new type of soft shell fleece or hard shell insulated waterproof jacket. Specifically, with the present seam design, no seam tape is required on the inner fleece side of the seam, and there is little or no loss of insulation at the seam. Any seam tape used on the exterior of the jacket can be selected to match the face fabric in color, texture, and stretch characteristics. Seams according to the present embodiments may also be made smaller, more flexible, and more comfortable than earlier designs for waterproof seams. Soft shell jackets according to the present embodiments also have superior properties compared to previously known hard shell jackets featuring waterproof seams. Hard shell jackets require an insulating material that lies between an exterior face fabric and a hydrostatic barrier membrane. In that position, the insulation is likely to become wet and lose its insulating effectiveness. This therefore may result in a reduced Clo value. The Clo value is a unit of thermal resistance and relates to the insulation required to produce the necessary heat to keep an individual comfortable at 21 degrees Centigrade with air movement at 0.1 meters per second. One Clo is about equal to the insulation value of typical indoor clothing. The present seam design according to the above embodiments, permits the insulating material to be placed on the inside of the jacket, and yet still permits the hydrostatic barrier membranes (FIG. 1, 107; FIG. 5, 507; FIG. 8, 807) of the laminated fabric (FIG. 1, 105, 110; FIG. 5, 505, 510; FIG. 8, 805, 810) to be joined within the seam (FIG. 2, 200; FIG. 7, 700; FIG. 9, 900) and to be connect through the seam (FIG. 2, 200; FIG. 7, 700; FIG. 9, 900) with an exterior seam tape (FIG. 3, 300) for added structure as described above.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:
1. A seam comprising:
a first piece of laminated fabric;
a second piece of laminated fabric;
a layer of adhesive hydrostatic polymer; and
a seam tape;
wherein the first and second pieces of laminated fabrics are coupled together at a common border with the layer of adhesive hydrostatic polymer to form a seam; and
wherein the seam tape is at least partially coupled along the seam;
in which the seam tape further comprises an adhesive plug coupled along a longitudinal axis of the seam tape and in which the adhesive plug is comprised of an adhesive hydrostatic polymer and is configured to conform in shape of the seam;
in which the first piece of laminated fabric further comprises a face fabric, a hydrostatic polymer membrane, and non-containable fabric; and
in which the second piece of laminated fabric further comprises a face fabric, a hydrostatic polymer membrane, and non-containable fabric.

2. The seam of claim 1, in which the adhesive hydrostatic polymer is extruded through the first and second pieces of laminated fabrics, adhering to the face fabrics of the first and second pieces of laminated fabrics thereby forming a continuous hydrostatic barrier between the first and second pieces of laminated fabrics along the seam.

3. The seam of claim 2, in which the seam tape covers the extruded adhesive hydrostatic polymer.

4. The seam of claim 1, in which the first piece of laminated fabric, second piece of laminated fabric and layer of adhesive hydrostatic polymer are coupled together using ultrasonic energy.

5. The seam of claim 1, in which the layer of adhesive hydrostatic polymer is comprised of polytetrafluoroethylene (PTFE), expanded PTFE (ePTFE), polyurethane, polypropylene, polyester or combinations thereof.

6. The seam of claim 1, in which the seam tape further comprises a fabric layer and an adhesive layer.

7. A seam comprising:
a first piece of laminated fabric;
a second piece of laminated fabric;
a layer of adhesive hydrostatic polymer; and
a seam tape;
wherein the first and second pieces of laminated fabrics are coupled together at a common border with the layer of adhesive hydrostatic polymer to form a seam; and
wherein the seam tape is at least partially coupled along the seam;
in which the seam tape further comprises an adhesive plug coupled along a longitudinal axis of the seam tape and in which the adhesive plug is comprised of an adhesive hydrostatic polymer and is configured to conform in shape of the seam;
in which the seam tape further comprises a fabric layer and an adhesive layer; and
in which the seam tape further comprises a hydrostatic barrier membrane layered between the fabric layer and adhesive layer.

8. A garment comprising a seam, the seam comprising:
a first piece of laminated fabric, the first piece of laminated fabric comprising a face fabric, a hydrostatic polymer membrane, and non-containable fabric;
a second piece of laminated fabric, the second piece of laminated fabric comprising a face fabric, a hydrostatic polymer membrane, and non-containable fabric;
a layer of adhesive hydrostatic polymer; and
a seam tape, the seam tape comprising a fabric layer and an adhesive layer;
wherein the first and second pieces of laminated fabrics are coupled together at a common border with the layer of adhesive hydrostatic polymer to form a seam;
the adhesive hydrostatic polymer of the layer of adhesive hydrostatic polymer is extruded through the first and second pieces of laminated fabrics, adhering to the face fabrics of the first and second pieces of laminated fabrics thereby forming a continuous hydrostatic barrier between the first and second pieces of laminated fabrics along the seam; and
wherein the seam tape is at least partially coupled along the seam;
in which the seam tape further comprises an adhesive plug coupled along the longitudinal axis of the seam tape and in which the adhesive plug is comprised of an adhesive hydrostatic polymer and is configured to conform in shape of the seam.

9. The garment of claim 8, in which the first piece of laminated fabric further comprises a face fabric, a hydrostatic polymer membrane, and non-containable fabric; and
in which the second piece of laminated fabric further comprises a face fabric, a hydrostatic polymer membrane, and non-containable fabric.

10. The garment of claim 9, in which the adhesive hydrostatic polymer is extruded through the first and second pieces of laminated fabrics, adhering to the face fabrics of the first and second pieces of laminated fabrics thereby forming a continuous hydrostatic barrier between the first and second pieces of laminated fabrics along the seam.

11. The garment of claim 10, in which the seam tape covers the extruded adhesive hydrostatic polymer.

12. The garment of claim 8, in which the first piece of laminated fabric, second piece of laminated fabric and layer of adhesive hydrostatic polymer are coupled together using ultrasonic energy.

13. The garment of claim 8, in which the layer of adhesive hydrostatic polymer is comprised of polytetrafluoroethylene (PTFE), expanded PTFE (ePTFE), polyurethane, polypropylene, polyester or combinations thereof.

14. The garment of claim 8, in which the seam tape further comprises a fabric layer and an adhesive layer.

15. The garment of claim 14, in which the seam tape further comprises a hydrostatic barrier membrane layered between the fabric layer and adhesive layer.

* * * * *